United States Patent Office 3,413,279
Patented Nov. 26, 1968

3,413,279
DISAZO PIGMENTS
Willy Mueller, Riehen, Switzerland, assignor to Ciba
Limited, Basel, Switzerland
No Drawing. Filed Jan. 18, 1966, Ser. No. 521,435
Claims priority, application Switzerland, Jan. 25, 1965,
996/65
8 Claims. (Cl. 260—176)

ABSTRACT OF THE DISCLOSURE

Disazo compounds of the formula (1) 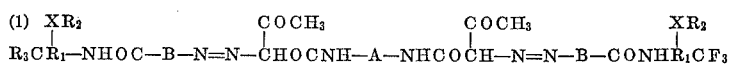

in which A and B represent arylene residues, $R_1$ represents a benzene residue, $R_2$ represents an alkyl, cycloalkyl, aralkyl or aryl residue and X represents an oxygen or sulphur atom and in which the group $XR_2$ is in ortho- or para-position to the —NH— group and the trifluoromethyl group is in meta-position to the —NH— group are valuable yellow pigments having an outstanding fastness to light.

The present invention is based on the observation that valuable disazo pigments of the formula (1) 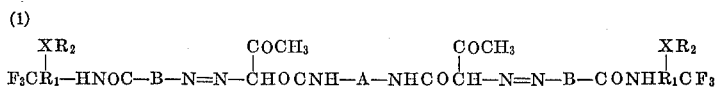

in which A and B represent arylene residues, $R_1$ represents a benzene residue, $R_2$ represents an alkyl, cycloalkyl, aralkyl or aryl residue and X represents an oxygen or sulphur atom and in which the group $XR_2$ is in ortho- or para-position to the —NH— group and the trifluoromethyl group is in meta-position to the —NH— group, are obtainable when (a) a dihalide of a dicarboxylic acid of the formula (2)

HOOC—B—N=N—CHOCNH—A—NHCOCH—N=N—B—COOH
           |                            |
           COCH₃                        COCH₃ is condensed in a molar ratio of 1:2 with an aminobenzene of the formula (3)
         XR₂
          |
    F₃C—R₁—NH₂ or (b) a diazo compound of an amine of the formula (4)
         XR₂
          |
    F₃C—R₁—NHCO—B—NH₂ is coupled in a molar ratio of 2:1 with a diacetoacetylarylenediamine of the formula (5)    H₃CCOCH₂CONH—A—NHCOCH₂COCH₃

Because the products of the invention are pigments they must not contain groups imparting solubility in water particularly acidic groups imparting solubility in water, for example, sulphonic acid or carboxylic acid groups.

The dicarboxylic acids of the Formula 2 may be advantageously obtained by coupling a diazo compound of a monocarboxylic acid of the formula HOOC—B—NH₂ in which B preferably represents a benzene residue, with a diacetoacetylarylenediamine of the Formula 5 in a molar ratio of 2:1, the arylene residue A in the Formula 5 preferably being a phenylene or diphenylene residue and especially a residue of the formula

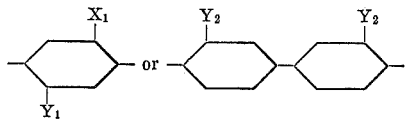

in which $X_1$ represents a hydrogen or halogen atom or an alkyl or alkoxy group, $Y_1$ represents a hydrogen or halogen atom or an alkyl, alkoxy, trifluoromethyl or cyano group and $Y_2$ represents a hydrogen or halogen atom or an alkyl or alkoxy group.

The diacetoacetyl-arylenediamines of the Formula 5 may be obtained in a simple manner by reacting diketene or ethyl acetoacetate with an aromatic diamine, for example, 1,4-diaminobenzene
1,3-diaminobenzene
1,3-diamino-4-methylbenzene
1,3-diamino-4-methoxybenzene
1,3-diamino-4-chlorobenzene
1,3-diamino-2,5-dichlorobenzene
1,4-diamino-2-chlorobenzene
1,4-diamino-2-bromobenzene
1,4-diamino-2-cyanobenzene
1,4-diamino-2,5-dichlorobenzene
1,4-diamino-2-methylbenzene
1,4-diamino-2-trifluoromethylbenzene
1,4-diamino-2,5-dimethylbenzene
1,4-diamino-2-methoxybenzene
1,4-diamino-2,5-dimethoxybenzene
1,4-diamino-2,5-diethoxybenzene
1,3-diamino-4,6-dimethylbenzene
1,3-diamino-2,6-dimethylbenzene
4,4'-diaminodiphenyl
3,3'-dichloro-4,4'-diaminodiphenyl
3,3'-dimethyl-4,4'-diaminodiphenyl
3,3'-dimethoxy-4,4'-diaminodiphenyl
3,3'-dimethoxy-4,4'-diamino-6,6'-dichlorodiphenyl
3,3',5,5'-tetrachloro-4,4'-diaminodiphenyl
3,3'-dichloro-5,5'-dimethyl-4,4'-diaminodiphenyl
2,8-diaminochrysene
4,11-diaminofluoranthene
and 2,6- or 1,5-diaminonaphthalene.

The compounds of the Formula 5 may be coupled with diazotized aromatic aminocarboxylic acids, preferably aminobenzenecarboxylic acids, especially those of the formula

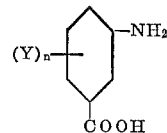

in which Y represents a hydrogen or halogen atom or an alkyl, alkoxy or carbalkoxy group and $n$ represents 1 or 2. The following aminocarboxylic acids may be mentioned as examples: 3-aminobenzoic acid, 4-aminobenzoic acid, 3-chloro-4-aminobenzoic acid, 4-chloro - 3 - aminobenzoic acid, 4-bromo-3-aminobenzoic acid, 4-fluoro-3-aminobenzoic acid, 2,4-dichloro-5-aminobenzoic acid, 3-methyl-4-aminobenzoic acid, 4-methyl-3-aminobenzoic acid, 2,4-dimethyl - 5-aminobenzoic acid, 4-methoxy-3-aminobenzoic acid, 3-nitro-4-aminobenzoic acid, 3-amino-terephthalic acid methyl ester and 3-amino-terephthalic acid ethyl ester.

The azodicarboxylic acids of the formula (2) may be treated with substances capable of converting carboxylic acids into their halides, for example, their bromides or chlorides. Thus phosphorus halides, for example, phosphorus trichloride, phosphorus pentachloride or phosphorus oxychloride, but especially thionyl chloride may be used. The treatment with the acid halogenating agents of the kind defined is advantageously carried out in an inert organic solvent, for example, in a chlorobenzene, for example, monochlorobenzene or a dichlorobenzene, toluene, xylene, benzene or nitrobenzene. When using thionyl chloride as acid chlorinating agent, it has been found to be advantageous to carry out the process in the presence of a dialkyl formamide, especially dimethyl formamide.

When preparing the carboxylic acid halides it is advantageous first to dry the azo compounds which have been prepared in an aqueous medium, or to free them from water by azeotropic distillation in an organic solvent. If desired, this azeotropic drying may be carried out immediately prior to the treatment with the acid halogenating agents.

The dicarboxylic acid halides so obtained are reacted with aminobenzenes of the formula

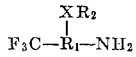

especially with those of the formula

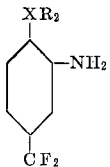

in which $R_2$ and X have the meanings given above. The following examples may be mentioned:

2-methoxy-5-trifluoromethylaniline,
2,4-dimethoxy-5-trifluoromethylaniline,
2-ethoxy-5-trifluoromethylaniline,
2-n-propoxy-5-trifluoromethylaniline,
2-isopropoxy-5-trifluoromethylaniline,
2-cyclohexyloxy-5-trifluoromethylaniline,
2-phenoxy-5-trifluoromethylaniline,
2-(ortho-methylphenoxy)-5-trifluoromethylaniline,
2-(para-methylphenoxy)-5-trifluoromethylaniline,
2-(para-methoxyphenoxy)-5-trifluoromethylaniline,
2-(ortho-chlorophenoxy)-5-trifluoromethylaniline,
2-(para-chlorophenoxy)-5-trifluoromethylaniline,
2-(para-bromophenoxy)-5-trifluoromethylaniline,
2-(2′,4′-dichlorophenoxy)-5-trifluoromethylaniline,
2-(α-naphthoxy)-5-trifluoromethylaniline,
2-(β-naphthoxy)-5-trifluoromethylaniline,
2-(para-diphenyloxy)-5-trifluoromethylaniline,
2-(2′,4′,5′-trichlorophenoxy)-5-trifluoromethylaniline,
2-(2′,3′,4′,5′,6′-pentachlorophenoxy)-5-trifluoromethylaniline,
2-methylmercapto-5-trifluoromethylaniline,
2-phenylmercapto-5-trifluoromethylaniline,
2-(para-methylphenylmercapto)-5-trifluoromethylaniline,
2-(para-chlorophenylmercapto)-5-trifluoromethylaniline,
4-methoxy-5-trifluoromethylaniline,
4-phenoxy-5-trifluoromethylaniline,
4-(para-chlorophenoxy)-3-trifluoromethylaniline,
4-(ortho-methylphenoxy)-3-trifluoromethylaniline and
4-(para-methylphenoxy)-3-trifluoromethylaniline.

The condensation of the carboxylic acid halides of the kind defined above with the amines is advantageously carried out in an anhydrous medium. Under these conditions it proceeds surprisingly easily, even at temperature within the boiling range of the common organic solvents, for example, toluene, monochlorobenzene, dichlorobenzene, trichlorobenzene and nitrobenzene. To accelerate the reaction it is generally advantageous to use an agent capable of binding acid, for example, anhydrous sodium acetate or pyridine. Some of the products obtained are crystalline and some are amorphous. Most of them are obtained in a vrey good yield and in a pure state. It is advantageous first to separate the carboxylic acid chloride obtained. In some cases, however, isolation of the acid chlorides can be omitted without harm and condensation carried out immediately after the preparation of the acid chlorides.

In method (b) of the process of the invention, a diazo compound of an amine of the formula (4) is coupled in a molar ratio of 2:1 with a diacetoacetyl-arylenediamine of the formula (5). It is advantageous to use diazo compounds of amines of the formula

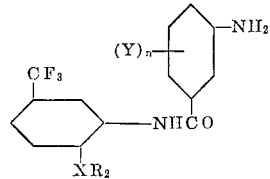

in which $R_2$, X, Y and $n$ have the meanings given above.

Coupling is preferably carried out in a slightly acid medium, advantageously in the presence of a substance generally used to assist coupling, particularly dispersing agents, for example, aralkyl sulphonates, for example, dodocylbenzene sulphonate or 1,1′-dinaphthylmethane-2,2′-disulphonic acid or polycondensation products of alkylene oxides. The dispersion of the coupling component may also advantageously contain protective colloids, for example, methylcellulose or small amounts of an inert organic solvent that is sparingly soluble or insoluble in water, for example, aromatic hydrocarbons that may be halogenated or nitrated, for example, benzene, toluene, xylene, chlorobenzene, dichlorobenzenes or nitrobenzene, as well as aliphatic halogenated hydrocarbons, for example, carbon tetrachloride or trichloroethylene, and also organic solvents miscible with water, for example, acetone, methylethylketone, methanol, ethanol or isopropanol.

Coupling may also advantageously be carried out in such manner that an acidic solution of a diazonium salt is continuously coupled with an alkaline solution of the coupling component in a mixing nozzle, whereby coupling takes place instantaneously. Care must be taken to ensure that the diazo component and coupling component are present in the mixing nozzle in equimolecular proportions, but in some cases it has been found to be advantageous to use a small excess of the diazo component. The simplest way to do this is by control of the pH value of the liquid in the mixing nozzle. Care must also be taken to ensure that the two solutions are in a state of turbulence in the mixing nozzle. The dyestuff dispersion thus formed is drawn off from the mixing nozzle continuously and the pigment is isolated by filtration.

The new products are valuable yellow pigments that are distinguished by an exceptionally high degree of light fastness and may be used for a very wide variety of purposes. For example, they may be used in a state of fine division for the spin-dyeing of cellulose ethers and esters, polyamides, polyurethanes and polyesters, as well as in the preparation of colored lacquers and as lake formers. They may also be used for coloring solutions and products made from cellulose acetate, nitrocellulose, natural and synthetic resins, for example, polymerization and condensation resins, for example, aminoplasts, alkyd resins, phenoplasts, polyolefines, for example, polystyrene, polyvinyl chloride, polyethylene, polypropylene, polyacrylonitrile, rubber, casein, silicones and silicone resins. They can also be used with advantage in the preparation of colored pencils, cosmetic preparations and laminated sheet material.

Compared with the pigments described in German patent specification No. 1,150,165 (Case 3782), the products of the invention possess a better fastness to light.

The following examples illustrate the invention. Unless otherwise stated, the parts and percentages are by weight.

Example 1

68.4 parts of the dry dyestuff prepared from 2 mols of diazotized 4-chloro-3-aminobenzoic acid and 1 mol of 2,5-bisacetoacetylamino - 1,4 - dichlorobenzene are stirred in 1,000 parts of ortho-dichlorobenzene together with 5 parts of dimethyl formamide and the batch is heated to 95 to 100° C. 32.8 parts of thionyl chloride are run in during 10 to 15 minutes and the batch is heated for 2 hours at 105 to 110° C. After the evolution of hydrochloric acid has subsided, the batch is allowed to cool to 40° C., the dyestuff carboxylic acid chloride is isolated by suction filtration and washed with 500 parts of cold ortho-dichlorobenzene.

A quantity of the produce still moist with ortho-dichlorobenzene corresponding to 7.21 parts of dry acid chloride is heated in 100 parts of ortho-dichlorobenzene together with 0.05 part of thionyl chloride to 95 to 100° C., whereupon a solution of 4.1 parts of 2-methoxy-5-trifluoromethylaniline and 0.5 part of pyridine in 50 parts of ortho-dichlorobenzene is added. The batch is stirred for 12 hours at 140 to 145° C., allowed to cool to 100° C., filtered, and then washed with hot ortho-dichlorobenzene until the filtrate runs completely colourless. Subsequently, the residue is washed with cold methanol and finally with hot water. When the residue is dried, a loose, soft pigment is obtained which produces a brilliant, greenish yellow tint displaying an excellent fastness to migration and to light when worked into polyvinyl chloride. The pigment so obtained corresponds to the formula

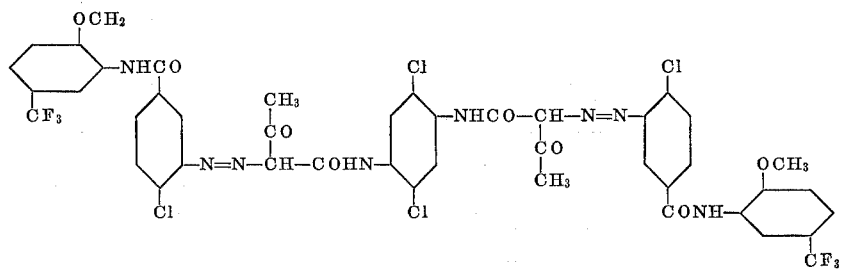

Example 2

34.5 parts of 4 - methoxy - 3 - (3' - amino - 4' - chlorobenzoylamino) - 1 - trifluoromethylenebenzene are stirred in 150 parts of glacial acetic acid together with 30 parts of 30% hydrochloric acid and the batch is cooled to —5° C. by the addition of 150 parts of ice. 25 parts of 4 N sodium nitrite solution are allowed to run in while stirring, the temperature being kept at 0 to 2° C. by the addition of ice. A clear, yellowish solution is obtained from which the diazonium salt eventually precipitates, some of it in crystalline form. The batch is diluted with ice and water until a clear solution is again formed. Any excess of nitrous acid is destroyed by the addition of urea and the pH of the diazo solution is adjusted to 4 by the addition of 50 parts of sodium acetate crystals.

16.2 parts of 2-chloro - 5 - methyl - 1,4 - bisacetoacetyl-aminobenzene are dissolved in 400 parts of water at 40 to 45° C. with 30 parts of 30% sodium hydroxide solution, the solution is clarified by filtration with 0.2 part of blood charcoal, 5 parts of n-butylsulphoricinoleate are added, and the whole is added dropwise to the diazo solution while stirring well. Coupling takes about one hour, the temperature of the mixture rising to 20 to 25° C. The diazo compound, which can still be clearly detected after the dropwise addition has been completed, disappears completely after the batch has been warmed for a short period at 30 to 35° C. The batch is then heated to 80 to 85° C. during one hour, filtered while hot, and the filter residue is washed free from salt with hot water. The residue is dried in vacuo at 95 to 100° C. and the pigment so obtained has a hard texture and cannot readily be subdivided. The pigment is stirred in 800 parts of nitrobenzene and heated for 3 to 4 hours at 140 to 145° C. After this period all the coarse and hard particles have disappeared and examination under the microscope shows that the product consists of small yellow needles of uniform size. The batch is allowed to cool to 100° C., filtered, and the filter residue is washed with hot nitrobenzene and subsequently with methanol until the filtrate runs completely colourless. The residue is then dried and a loose, soft pigment is obtained that can readily be dispersed in synthetic materials and lacquer media. It colours polyvinylchloride brilliant greenish yellow tints possessing a very good fastness to migration and to light.

Example 3

203.25 parts of 4 - trifluoromethyl - 2 - (4' - chloro-3' - aminobenzoylamino) - diphenylether are dissolved in 200 parts of warm glacial acetic acid and the solution is run into a solution of 250 parts of 30% hydrochloric acid and 10 parts of the sodium salt of N-benzyl-μ-heptadecyl-benzimidazole disulphonic acid in 100 parts of ice-water while stirring. The batch is then diazotized at 0 to 5° C. with 125 parts of 4 N sodium nitrite solution and clarified by filtration.

81.5 parts of 5-chloro-2-methyl-1,4-bisacetoacetyl-aminobenzene are dissolved in a mixture of 300 parts of 30% sodium hydroxide solution and 2,000 parts of water. The two solutions, if necessary, after dilution with water, are conducted continuously to a mixing nozzle where coupling takes place instantaneously. The pH value in the mixing nozzle is kept at between 4.5 and 5.5 by regulating the supply of the solutions. The temperature must be 30° C. The temperature can be regulated by the addition of water to the solutions of the components. The pigment suspension formed is filtered, the filter residue is washed free from salt with water and then well pressed. The press cake is heated for some hours at 100 to 110° C. in 2,000 parts of ortho-dichlorobenzene, during which process the major proportion of the water is distilled off azeotropically. The batch is then filtered while hot and the filter residue is washed with hot ortho-dichlorobenzene until the filtrate runs clear and colourless. Subsequently, the filter residue is washed successively with cold methanol and water. It is dried in vacuo at 70 to 75° C. and a yellow pigment is obtained in good yield which colours polyvinylchloride brilliant greenish yellow tints possessing very good fastness to migration and light.

In the following table are listed further components which yield pigments by the process described in Examples 1 to 3. In Column I are listed the diamines from which the acetoacetic arylides used as coupling components are derived. In Column II are listed the aminobenzene carboxylic acids used as the diazo components and in Column III the 2-amino-4-trifluoromethylphenyl ethers used as arylide bases. The tints produced by a 0.2% colouration in polyvinylchloride with the pigments are indicated in Column IV.

| | I | II | III | IV |
|---|---|---|---|---|
| 1 | Para-phenylenediamine | 4-chloro-3-amino benzoic acid | 2-methoxy-5-trifluoromethylaniline | Greenish yellow. |
| 2 | do | do | 2-phenoxy-5-trifluoromethylaniline | Do. |
| 3 | 2-chloro-1,4-phenylenediamine | do | do | Do. |
| 4 | do | do | 2-(ortho-methylphenoxy)-5-trifluoromethylaniline | Do. |
| 5 | do | do | 2-(ortho-chlorophenoxy)-5-trifluoromethylaniline | Do. |
| 6 | do | do | 2-(para-chlorophenoxy)-5-trifluoromethylaniline | Do. |
| 7 | do | do | 2-(2',4'-dichlorophenoxy)-5-trifluoromethylaniline | Do. |
| 8 | do | do | 2-(2',4',5'-trichlorophenoxy)-5-trifluoromethylaniline | Do. |
| 9 | 2,5-dichloro-1,4-phenylenediamine | do | 2-methoxy-5-trifluoromethylaniline | Yellow. |
| 10 | do | do | 2-(n-butoxy)-5-trifluoromethylaniline | Greenish yellow. |
| 11 | do | do | 2-cyclohexyloxy-5-trifluoromethylaniline | Do. |
| 12 | 2-methyl-1,4-phenylenediamine | do | 2-phenoxy-5-trifluoromethylaniline | Do. |
| 13 | do | do | 2-(para-chlorophenoxy)-5-trifluoromethylaniline | Do. |
| 14 | 2-methyl-5-chloro-1,4-phenylenediamine | do | 2-methoxy-5-trifluoromethylaniline | Do. |
| 15 | do | do | 2-phenoxy-5-trifluoromethylaniline | Do. |
| 16 | do | do | 2-(ortho-methylphenoxy)-5-trifluoromethylaniline | Do. |
| 17 | do | do | 2-(ortho-chlorophenoxy)-5-trifluoromethylaniline | Do. |
| 18 | do | do | 2-(para-chlorophenoxy)-5-trifluoromethylaniline | Do. |
| 19 | do | do | 2-(2',4'-dichlorophenoxy)-5-trifluoromethylaniline | Do. |
| 20 | do | do | 2-(2',4',5'-trichlorophenoxy)-5-trifluoromethylaniline | Do. |
| 21 | do | do | 2-cyclohexyloxy-5-trifluoromethylaniline | Do. |
| 22 | do | do | 2-phenylmercapto-5-trifluoromethylaniline | Do. |
| 23 | do | do | 2-(para-chlorophenylmercapto)-5-trifluoromethylaniline | Do. |
| 24 | do | 4-methyl-3-amino benzoic acid | 2-phenoxy-5-trifluoromethylaniline | Do. |
| 25 | do | do | 2-(para-chlorophenoxy)-5-trifluoromethylaniline | Do. |
| 26 | do | do | 2-(ortho-chlorophenoxy)-5-trifluoromethylaniline | Do. |
| 27 | do | 2,4-dichloro-5-amino benzoic acid | 2-phenoxy-5-trifluoromethylaniline | Do. |
| 28 | do | do | 2-(ortho-methylphenoxy)-5-trifluoromethylaniline | Do. |
| 29 | do | do | 2-(2',4'-dichlorophenoxy)-5-trifluoromethylaniline | Do. |
| 30 | do | 4-methoxy-3-amino benzoic acid | 2-phenoxy-5-trifluoromethylaniline | Do. |
| 31 | do | 2,4-dimethyl-5-amino benzoic acid | do | Do. |
| 32 | do | do | 2-(para-chlorophenoxy)-5-trifluoromethylaniline | Do. |
| 33 | do | 2-aminoterephthalic acid-1-methylester | do | Do. |
| 34 | do | do | 2-phenoxy-5-trifluoromethylaniline | Do. |
| 35 | do | do | 2-(ortho-methylphenoxy)-5-trifluoromethylaniline | Do. |
| 36 | do | do | 2-methoxy-5-trifluoromethylaniline | Do. |
| 37 | do | do | 2-(n-butoxy)-5-trifluoromethylaniline | Do. |
| 38 | do | do | 2-cyclohexyloxy-5-trifluoromethylaniline | Do. |
| 39 | do | do | 2-phenylmercapto-5-trifluoromethylaniline | Do. |
| 40 | do | do | 2-(para-chlorophenylmercapto)-5-trifluoromethylaniline | Do. |
| 41 | 2,5-dimethyl-1,4-phenylenediamine | 4-chloro-3-amino benzoic acid | 2-methoxy-5-trifluoromethylaniline | Neutral yellow. |
| 42 | do | do | 2-phenoxy-5-trifluoromethylaniline | Do. |
| 43 | do | do | 2-(ortho-chlorophenoxy)-5-trifluoromethylaniline | Do. |
| 44 | do | do | 2-phenylmercapto-5-trifluoromethylaniline | Greenish yellow. |
| 45 | 2-trifluoromethyl-1,4-phenylenediamine | do | 2-phenoxy-5-trifluoromethylaniline | Do. |
| 46 | do | do | 2-(ortho-chlorophenoxy)-5-trifluoromethylaniline | Do. |
| 47 | do | do | 2-(para-chlorophenoxy)-5-trifluoromethylaniline | Do. |
| 48 | do | 2,4-dichloro-5-amino benozoic acid | do | Do. |
| 49 | do | do | 2-methoxy-5-trifluoromethylaniline | Do. |
| 50 | 2-methyl-5-methoxy-1,4-phenylenediamine | 4-chloro-3-amino benzoic acid | 2-phenoxy-5-trifluoromethylaniline | Neutral yellow. |
| 51 | do | do | 2-(para-chlorophenoxy)-5-trifluoromethylaniline | Do. |
| 52 | 2,5-dimethoxy-1,4-phenylenediamine | do | 2-phenoxy-5-trifluoromethylaniline | Yellow. |
| 53 | 2,5-diethoxy-1,4-phenylenediamine | do | do | Reddish yellow. |
| 54 | do | do | 2-(para-chlorophenoxy)-5-trifluoromethylaniline | Do. |
| 55 | do | do | 2-(ortho-methylphenoxy)-5-trifluoromethylaniline | Do. |
| 56 | 4,4'-diaminodiphenyl | do | 2-methoxy-5-trifluoromethylaniline | Greenish yellow. |
| 57 | do | do | 2-phenoxy-5-trifluoromethylaniline | Do. |
| 58 | 3,3-dimethyl-4,4'-diaminodiphenyl | do | do | Do. |
| 59 | do | do | 2-(para-chlorophenoxy)-5-trifluoromethylaniline | Greenish yellow. |
| 60 | 3,3-dichloro-4,4'-diaminodiphenyl | do | do | Do. |
| 61 | do | do | 2-methoxy-5-trifluoromethylaniline | Do. |
| 62 | do | do | 2-cyclohexyloxy5-trifluoromethylaniline | Do. |
| 63 | do | do | 2-(para-chlorophenoxy)-5-trifluoromethylaniline | Do. |
| 64 | 2,5-dichloro-1,4-phenylenediamine | 4-amino benzoic acid | 2-phenoxy-5-trifluoromethylaniline | Do. |
| 65 | do | 3-nitro-4-amino benzoic acid | do | Do. |
| 66 | 2-cyano-1,4-phenylenediamine | 4-chloro-3-amino benzoic acid | do | Do. |
| 67 | 2-methyl-5-chloro-1,4-phenylenediamine | do | 4-methoxy-5-trifluoromethylaniline | Do. |
| 68 | do | do | 4-phenoxy-5-trifluoromethylaniline | Do. |
| 69 | 2,5-dichloro-1,4-phenylenediamine | do | do | Do. |
| 70 | 2,5-dimethyl-1,4-phenylenediamine | do | do | Yellow. |

| | I | II | III | IV |
|---|---|---|---|---|
| 71 | 2-chloro-1,4-phenylenediamine | 4-chloro-3-amino-benzoic acid | 4-phenoxy-5-trifluoromethylaniline | Greenish yellow. |
| 72 | 2-methoxy-5-chloro-1,4-phenylenediamine | ...do... | ...do... | Yellow. |
| 73 | 2-methyl-5-methoxy-1,4-phenylenediamine | ...do... | ...do... | Reddish yellow. |
| 74 | 2,5-dimethoxy-1,4-phenylenediamine | ...do... | ...do... | Orange. |
| 75 | 1,3-phenylenediamine | ...do... | 2-phenoxy-5-trifluoromethylaniline | Neutral yellow. |
| 76 | 2,4-dichloro-1,3-phenylenediamine | ...do... | 2-(para-chlorophenoxy)-5-trifluoromethylaniline | Greenish yellow. |
| 77 | 2,4-dimethyl-1,3-phenylenediamine | ...do... | ...do... | Neutral yellow. |
| 78 | 2-chloro-5-methyl-1,4-phenylene- | ...do... | 2-(para-bromophenoxy)-5-trifluoromethylaniline | Greenish yellow. |
| 79 | ...do... | ...do... | 2-(para-methoxyphenoxy)-5-trifluoromethylaniline | Do. |
| 80 | ...do... | ...do... | 2-para-diphenyloxy-5-trifluoromethylaniline | Do. |
| 81 | ...do... | ...do... | 2-($\alpha$-naphthoxy)-5-trifluoromethylaniline | Do. |
| 82 | ...do... | ...do... | 2-($\beta$-naphthoxy)-5-trifluoromethylaniline | Do. |
| 83 | 2,5-dichloro-1,4-phenylenediamine | ...do... | 4-methoxy-3-trifluoromethylaniline | Yellow. |
| 84 | ...do... | ...do... | 4-phenoxy-3-trifluoromethylaniline | Greenish yellow |
| 85 | ...do... | ...do... | 4-(2'-chlorophenoxy)-3-trifluoromethylaniline | Do. |
| 86 | ...do... | ...do... | 4-(4'-methylphenoxy)-3-trifluoromethylaniline | Do. |
| 87 | 2-chloro-1,4-phenylenediamine | ...do... | 4-methoxy-3-trifluoromethylaniline | Do. |
| 88 | ...do... | ...do... | 4-phenoxy-3-trifluoromethylaniline | Do. |
| 89 | ...do... | ...do... | 4-(4'-chlorophenoxy)-3-trifluoromethylaniline | Do. |
| 90 | 2-chloro-5-methyl-1,4-phenylenediamine | ...do... | 4-methoxy-3-trifluoromethylaniline | Do. |
| 91 | ...do... | ...do... | 4-phenoxy-3-trifluoromethylaniline | Do. |
| 92 | ...do... | ...do... | 4-(2'-methylphenoxy)-3-trifluoromethylaniline | Do. |
| 93 | 2,5-dimethyl-1,4-phenylenediamine | ...do... | ...do... | Yellow. |
| 94 | ...do... | ...do... | 4-phenoxy-3-trifluoromethylaniline | Greenish yellow. |
| 95 | 3,3'-dimethoxy-4,4'-diamino-6,6'-dichlorodiphenyl | ...do... | ...do... | Neutral yellow. |
| 97 | ...do... | ...do... | 2-phenoxy-5-trifluoromethylaniline | Do. |

What is claimed is:

1. A disazo-pigment of the formula in which A is an at most bicyclic unsubstituted arylene radical or substituted by chlorine atoms, lower alkyl, lower alkoxy and trifluoromethyl groups, Y a member selected from the group consisting of hydrogen and chlorine atoms, lower alkyl and lower alkoxy groups, one Z is a member selected from the group consisting of lower alkoxy, cyclohexylalkoxy, phenoxy, chlorophenoxy, bromophenoxy lower alkyl-phenoxy, lower alkylmercapto and phenylmercapto groups and the other Z is hydrogen and $n$ is a number from 1 to 2.

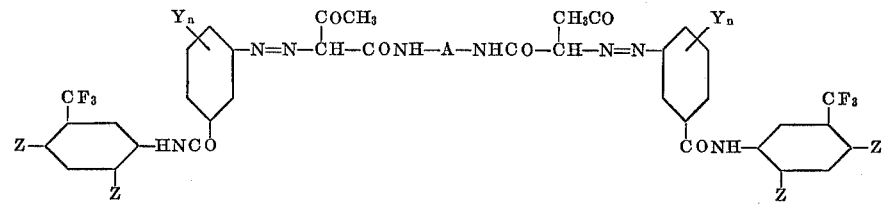

2. A disazo-pigment as claimed in claim 1 of the formula

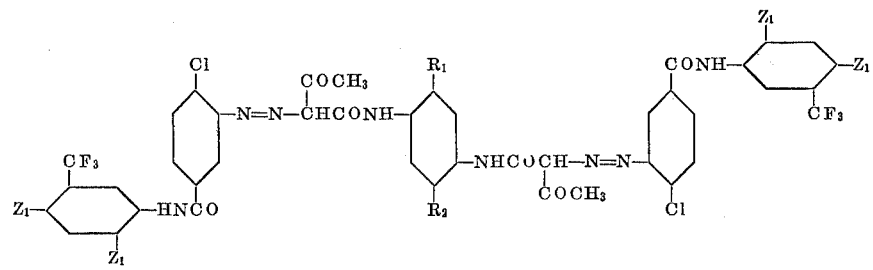

in which $R_1$ and $R_2$ are members selected from the group consisting of hydrogen and chlorine atoms, lower alkyl, lower alkoxy and trifluoromethyl groups, one $Z_1$ is a member selected from the group consisting of phenoxy, chlorophenoxy and lower alkyl-phenoxy radicals and the other $Z_1$ is hydrogen.

3. The dyestuff as claimed in claim 1 of the formula
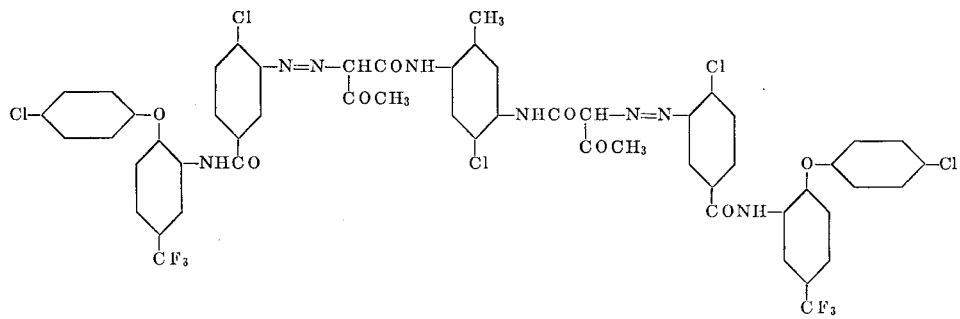
4. The dyestuff as claimed in claim 1 of the formula
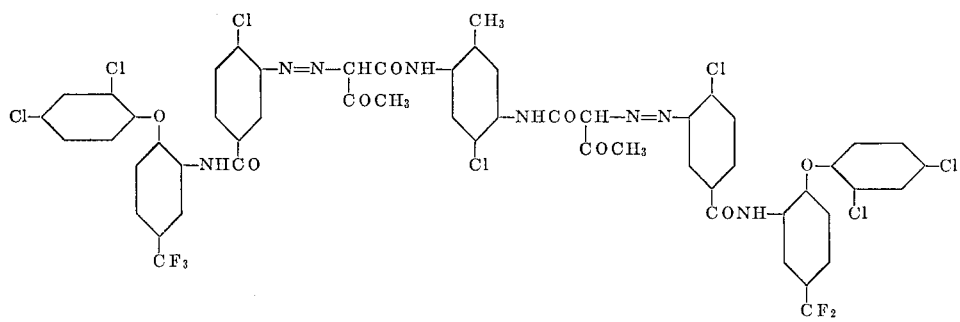
5. The dyestuff as claimed in claim 1 of the formula
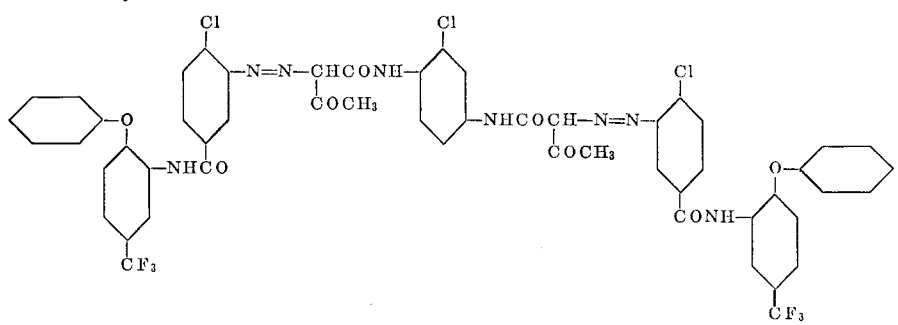
6. The dyestuff as claimed in claim 1 of the formula
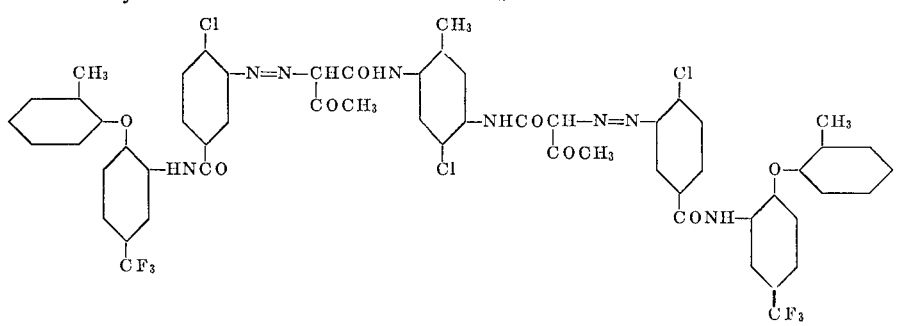
7. The dyestuff as claimed in claim 1 of the formula
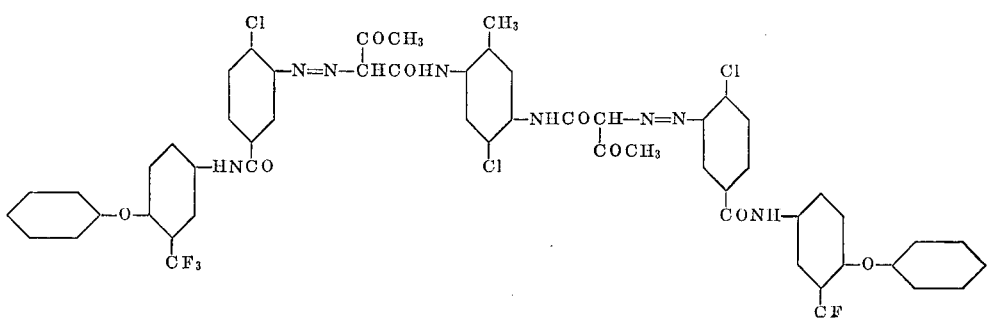

8. The dyestuff as claimed in claim 1 of the formula
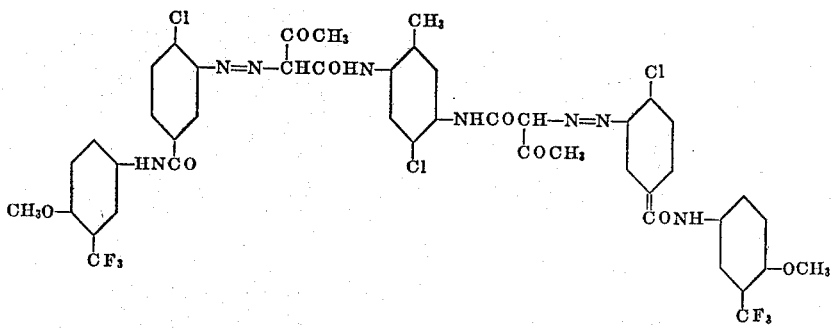
References Cited
UNITED STATES PATENTS
2,984,660    5/1961    Ribka _____ 260—176
CHARLES B. PARKER, *Primary Examiner.*
D. M. PAPUGA, *Assistant Examiner.*

UNITED STATES PATENT OFFICE
CERTIFICATE OF CORRECTION

Patent No. 3,413,279                                                        November 26, 1968

Willy Mueller

It is certified that error appears in the above identified patent and that said Letters Patent are hereby corrected as shown below:

Column 10, line 73, "conesisting" should read -- consisting --. Columns 11 and 12, claim 4, the lower-right hand portion of the formula should appear as shown below:

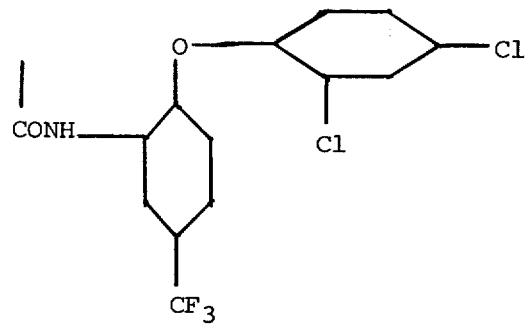

same columns 11 and 12, claim 7, the lower right-hand portion of the formula should appear as shown below:

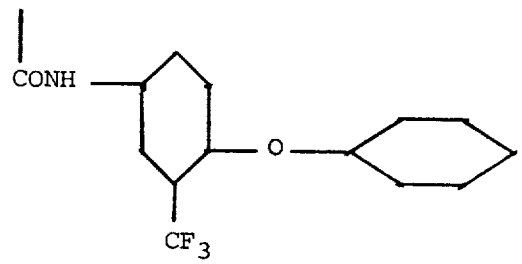

Signed and sealed this 17th day of March 1970.

(SEAL)
Attest:

EDWARD M.FLETCHER,JR.
Attesting Officer

WILLIAM E. SCHUYLER, JR.
Commissioner of Patents